(12) United States Patent
Barchi

(10) Patent No.: US 8,793,383 B2
(45) Date of Patent: Jul. 29, 2014

(54) TRANSPARENT TRANSFER OF A TWO-WAY COMMUNICATION

(75) Inventor: Ronald S. Barchi, Maple Valley, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1449 days.

(21) Appl. No.: 11/497,903

(22) Filed: Aug. 1, 2006

(65) Prior Publication Data

US 2008/0043971 A1 Feb. 21, 2008

(51) Int. Cl.
*G06F 15/16* (2006.01)

(52) U.S. Cl.
USPC .......................................................... 709/227

(58) Field of Classification Search
CPC ............. H04L 29/06; H04L 29/08576; H04L 29/08072; H04L 29/0809; H04L 29/06095
USPC .................................. 709/206, 227
See application file for complete search history.

(56) References Cited

U.S. PATENT DOCUMENTS

| 7,502,797 B2 * | 3/2009 | Schran et al. ........................... 1/1 |
| 2002/0032770 A1 * | 3/2002 | Fertell et al. .................. 709/224 |
| 2003/0088765 A1 | 5/2003 | Eschbach et al. ............. 713/150 |
| 2004/0003041 A1 | 1/2004 | Moore et al. ................... 709/204 |
| 2005/0149630 A1 * | 7/2005 | Smolinski et al. ............ 709/227 |
| 2007/0282623 A1 * | 12/2007 | Dattorro ........................... 705/1 |

FOREIGN PATENT DOCUMENTS

WO WO 2004/075025 9/2004

OTHER PUBLICATIONS

Anti-cyberstalking: the Predator and Prey Alert (PAPA) system Aggarwal, S.; Burmester, M.; Henry, P.; Kermes, L.; Mulholland, J.; Systematic Approaches to Digital Forensic Engineering, 2005. First International Workshop on Nov. 7-9, 2005 pp. 195-205.*
Aggarwal et al., "Anti-Cyberstalking: The Predator and Prey Alert (PAPA) System," First International Workshop on Systematic Approaches to Digital Forensic Engineering (SADFE'05), 2005, 195-205.

* cited by examiner

*Primary Examiner* — Emmanuel L Moise
*Assistant Examiner* — Mahran Abu Roumi
(74) *Attorney, Agent, or Firm* — Baker & Hostetler LLP

(57) ABSTRACT

A first user at a first computing device communicates with a second user at a second computing device. Both devices communicate in real-time via a network service such as in instant messaging service. The network service upon request of the one of the users can transfer the real-time communication session between the first user and the second user to a third user. The third user adopts the identity of the transferring user for the course of the communication session. This would be useful to transfer a communication session regarding an illegal subject to a law enforcement agency.

18 Claims, 6 Drawing Sheets

TRANSPARENT TRANSFER OF A TWO-WAY COMMUNICATION

FIELD OF THE INVENTION

The invention relates generally to the field of computing. More particularly, the invention relates to a system and method for communication over a computing network.

BACKGROUND

A variety of network services enables a user to learn about the presence of other computer user's on a network such as an Intranet or the Internet, and to communicate with them in real-time. Such services are generally referred to as instant messaging. Instant messaging services provide users with the ability to view the on-line state or send messages to other users.

Instant messaging services provide a variety of function to users. For example, the instant messaging services maintain state changes (e.g. user is on-line, user is offline, user is idle). Additionally, the instant messaging services act as a switch board through which users can establish communication sessions without requiring a direct network connection between users. When a user desires to communicate with another user, the user sends a message to the instant messaging service, which then sends a message to the destination user to connect in a session with the sending user.

Instant messaging services typically use user handles for identifying users. A user handle (also known as "account name," "logon name" or "screen name") is a representation of the user's identity that is both unique and persistent. The user handle is typically equivalent to an e-mail address. As with email addresses, the handle is independent of a particular computing device and can be used to identify a user on any computer system that can connect to the service with the requisite client software.

In typical instant messenger communications, a user to user communication is temporal. That is, at the end of a communication session, the communication between a pair of users is not saved or recorded other than during a particular session. After the session ends, such as when a user logs out, the communication is lost.

As noted above, instant messaging services facilitate communication among users by the use of handles. As such, there is a certain amount of anonymity in the communications. In other words, when a user signs up for an account and an associated handle, there is typically no verification of the information provided by that user. For example, a male could sign up as a female. A young person can sign up as an older person and vice-versa. As a result, communication can and does occur between complete strangers or between users pretending to be peers of other users, for example.

SUMMARY OF THE INVENTION

In consideration of such needs in the art, the invention provides systems and methods for providing allowing a communication session between a first user and a second user to be transferred to a third party without the know of one of the users in the communication session. The systems and methods described herein relate in part to an instant messaging protocol that is useful for establishing a communication session between a first user and a second user by way of a network service. The protocol for transferring the communication session from either one of the first user or the second user to a third user wherein the third user retains an identity of the transferring one of the first user and the second user for the duration of the communication session. Preferably, at least a partial history of the communication session is transferred to the third user so that the third user can understand the interaction between the first user and the second user.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
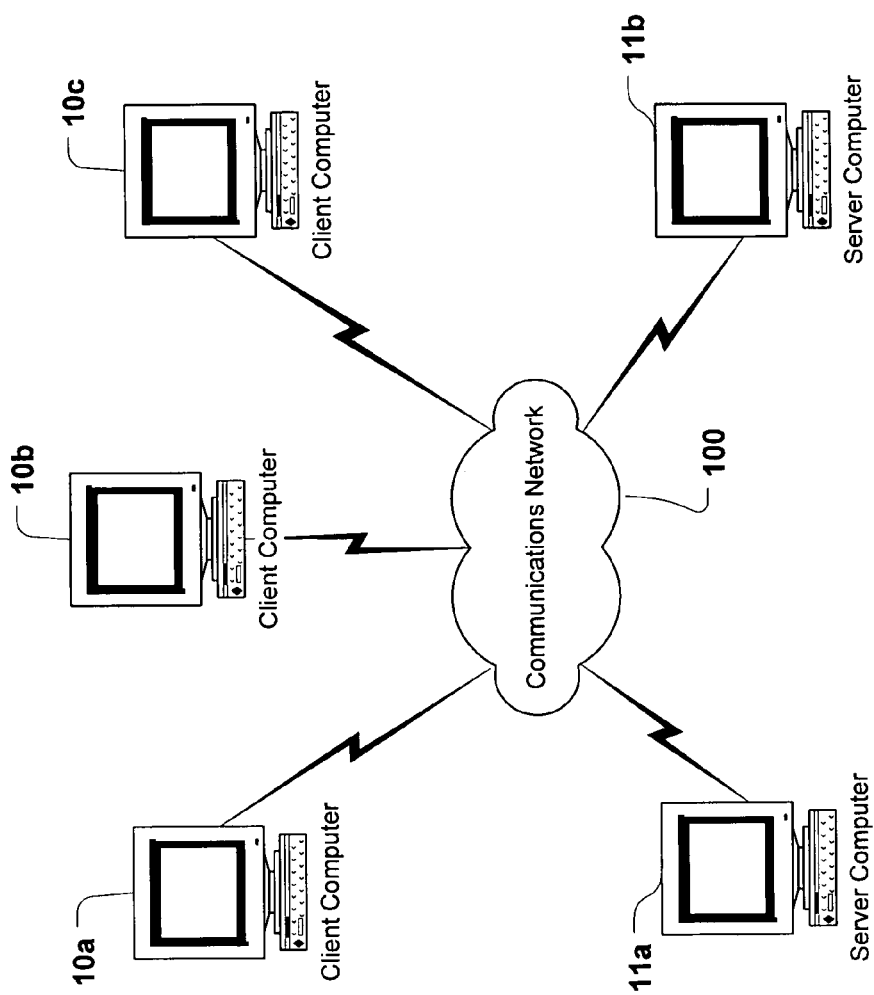
FIG. 1 is an example of a computer network wherein aspects of the present invention may be employed.

FIG. 1 illustrates an example embodiment of a computer network wherein various computing devices 10a-10c and 11a-11b are all connected to the communications network 100. Although the physical environment shows the connected devices as computers, such illustration is merely an example and may instead comprise various digital devices such as PDAs, cell phones, MP3 players, etc. Moreover, communications network 100 may itself comprise a number of computers and network devices such as routers and the like, which also may be capable of hosting various computing objects and/or providing services to the various computing devices 10a-10c and 11a-11b connected to communications network 100.

There are a variety of systems, components, and network configurations that support networked computing environments. For example, computing systems may be connected together by wireline or wireless systems, by local networks or widely distributed networks. Currently, many of the networks are coupled to the Internet which provides the infrastructure for widely distributed computing and encompasses many different networks. In FIG. 1, for example, aspects of communications network 100 may be provided by the Internet.

In various small scale networks, e.g. home or office networking environments, there are at least four disparate network transport media that may each support a unique protocol including broadband (DSL, Cable modem, fiber), power line, wireless and narrowband (telephone). Data Services enter as and is accessible using any number of available wireless (802.11g/b and the like) or wired (Ethernet or power line) connectivity. All of these network environments may be interconnected to form an intranet that may be connected to the outside world by way of the Internet.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the networks. Because of such wide-spread information sharing, remote networks such as the Internet have thus far generally evolved into an "open" system for which software applications can be accessed to performing specialized operations or services essentially without restriction.

The network infrastructure enables a host of network topologies such as client/server, peer-to-peer, or hybrid architectures. The "client" is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In a client/server architecture, particularly a networked system, a client is usually a computer that accesses shared network resources provided by another computer (i.e., a server). In the example of FIG. 1, computers 10a-c represent examples of clients and computers 11a-b represent examples of servers where server 11a for example may be accessed by any one of the client computers 10a-c via the network communications provided server 11a authorizes such access. Similarly clients 10a-c may access server 11b. Servers 11a-b may provide services to clients 10a-c, such as facilitating communications between and among the various other client computers 10a-c and/or may provide a mechanism for clients 10a-c to discover each other and provide a path whereby the clients 10a-c may communicate directly in a peer-to-peer fashion.

A server is typically a remote computer system accessible over a remote network such as the Internet. A client process may be active in a first computer system (thereby, at least temporally, making it a client device), and a server process may be active in a second computer system (thereby, at least temporally, making it a server device), communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW) or, simply, the "Web." Typically, a computer network address such as a Uniform Resource Locator (URL) or an Internet Protocol (IP) address is used to identify the server or client computers to each other. The network address can be referred to as a Uniform Resource Locator address. For example, communication can be provided over a communications medium. In particular, the client and server may be coupled to one another via TCP/IP connections for high-capacity communication.

In general, the computer network may comprise both server devices and client devices deployed in a network environment (in a peer-to-peer environment devices may be both clients and servers. Thus, the present invention can be utilized in a computer network environment having client computers for accessing and interacting with the network and a server computer for interacting with client computers. However, the systems and methods of the invention can be implemented with a variety of network-based architectures, and thus should not be limited to the example shown.

Figure 2:
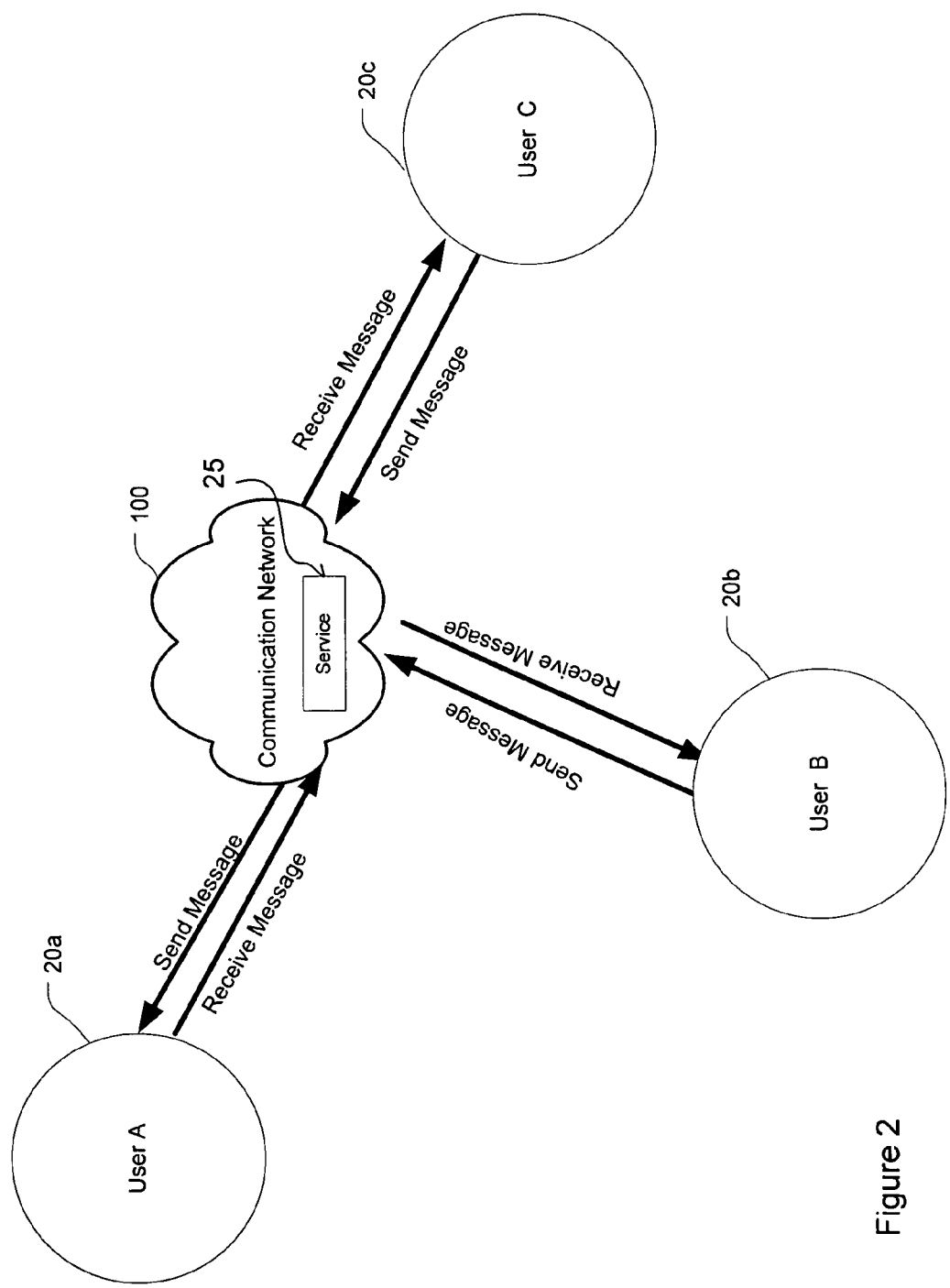
FIG. 2 is an illustration of objects within the distributed computer network communicating by way of a network services.

FIG. 2 illustrates a further aspect of the system of the present invention. A computer process 20a may connect to a network service represented by service 25 via communication network 100 so that the computing process 20a and the service 25 can exchange messages as indicated by the dashed lines. Similarly computer processes 20b and 20c may also connect to network service 25.

Network service 25 may track of the attributes of the computer process 20a, 20b, 20c, etc. that have connected to it. By tracking attributes of the various computer processes 20a, 20b, 20c, network service 25 can provide information to computing processes 20a-20c in the network regarding the status of others of the computer processes 20a, 20b, 20c, etc. For example, the network service 25 may track whether a computing process is connected, unconnected, etc. and can facilitate communication among the various objects 20a, 20b, 20c. In general, network service 25 may act as a proxy between computer processes 20a, 20b, and 20c allowing various computer processes 20a, 20b, 20c to communicate with each other without regard to location, computing device type, etc.

The communications network 100 can be used as a communications medium between the computer processes by way of the network service 25. A user can connect to the network service 25 at any one of a variety of computing devices. By connecting to network service 25 and providing identity information, a user can make his or her presence known to network service 25 and other computer processes in the network. Accordingly, network service 25 may also track identity information regarding various users connected to via computer processes 20a, 20b, 20c, and so on.

A network service that facilitates such communications between and among the various users and computer processes in connected or unconnected to it in which real-time messaging occurs between users are generally referred to as instant messaging services. There are a number of available instant messaging services provided by companies such as AOL, Microsoft, Yahoo! to name a few. The invention is not limited to any particular instant messenger or to instant messengers per se. Instant messengers are discussed herein to provide one example wherein the systems and methods described may be employed.

Instant messenger service can be device-based and/or network-based. Such services allow a user to create lists of other users whose presence on the network the user wants to know about (sometimes referred to as a "buddy list"). The user's contact list information may stored on the device used to access the system. For example, the computer process 10a could store contact list information. The user installs a computer process 20a-c to a computing device, such as 10a-c. The user's list of contacts and other preferences specific to the user can be saved locally on that computer's storage medium (not shown). The user contact list may also be stored on or replicated to a network-based server, e.g., computing device 11a, so users have access to the same services and information, no matter how or where they access the system. Client software is loaded on a computing device as needed and used to access the service 25. Contact list, addresses, and other personal information can be stored on the network, e.g., by network service 25, and be made available whenever users log into the system.

When a user logs into the service 25 a computer process, e.g., 20a-c, is created where ever the user logs in. Users have the same information and the same services whether logging on from their home computers, office computers, library, internet café, mobile phone, and so on.

Figure 3:
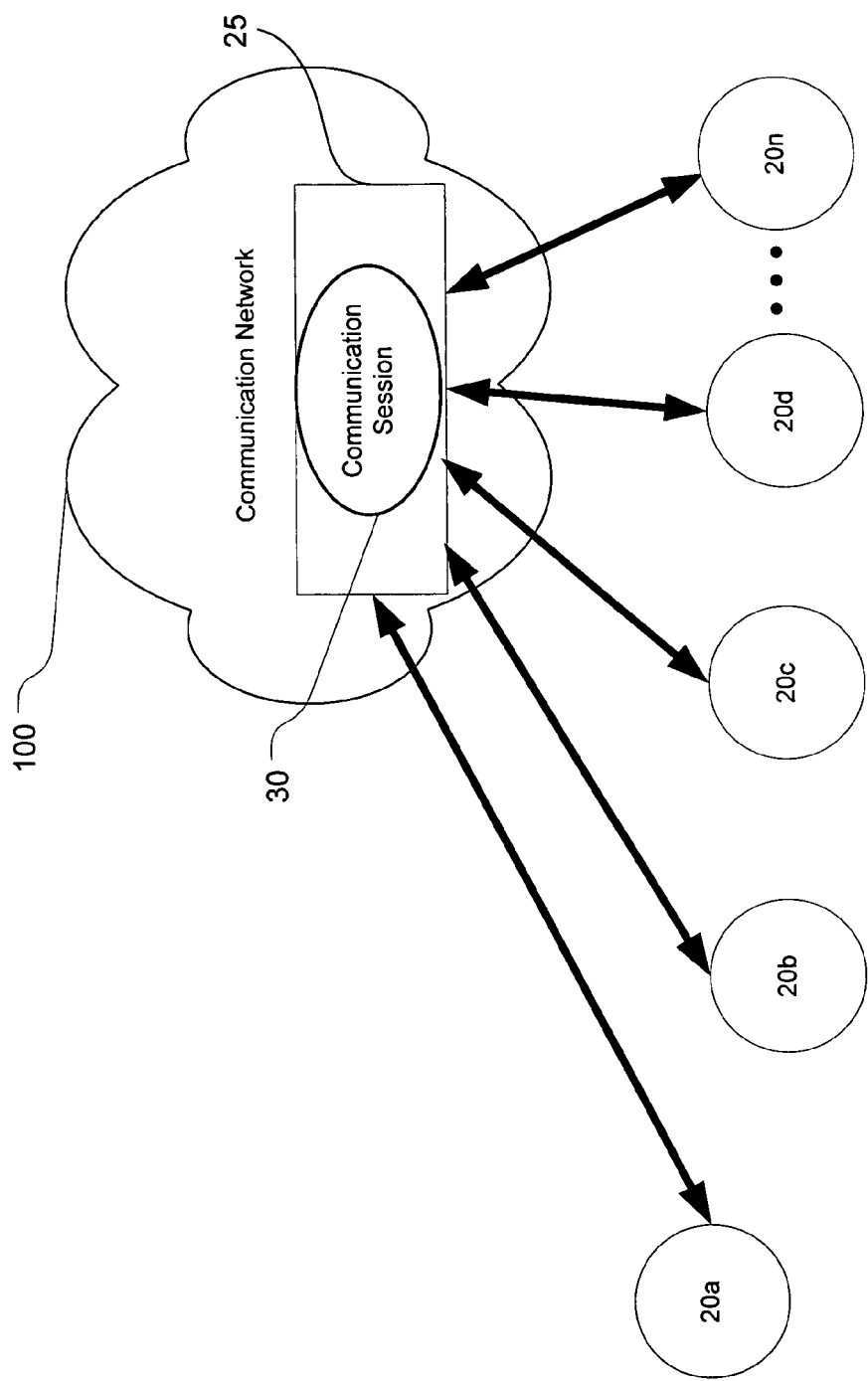
FIG. 3 is an illustration of how users communicate in a communication session.

FIG. 3 illustrates how various computer process may communicate using network service 25 to facilitate communication between and among the various computer processes 20a, 20b, 20c, etc. In particular, computer processes 20a-20n may communicate with any other of the computer processes 20a-

20n, provided a session has been initiated and accepted between one or more of the computer processes 20-20n. Network service 25 maintains a conversation session 30 that maintains information about the various computer processes 20a-20n such as IP addresses, login names, status, and so on.

Other services are necessary to enable the conversation session 30. For example, a buddy list service typically exposes a user's presence to others and makes it possible to see the presence of others. After seeing that another user appears active on a buddy list, a conversation session can be initiated. In such a case, a first user, e.g., 20a (first_user) initiates a session with another user, e.g., 20c (second_user) by, for example, clicking on the other users name on the buddy list. Thereafter, a conversation session is initiated, whereby first_user sends a message to second_user by way of conversation session 30. After the conversation session is initiated, first_user can send messages to second_user and second_user can send messages to first_user. The network service 25 manages the physical contact information (e.g., IP addresses) needed to properly route the messages between users.

Simultaneously, first_user can establish another conversation session with a third user, e.g., 20n (third_user) in the same way that the conversation session was established between first_user and second_user. The conversation session between first_user and third_user can be ongoing even while the conversation between first_user and second_user is taking place.

Users can discover handles of other users in any number of ways. One way is to receive the information directly from the other user such as through an email message, a chat room discussion, etc. The information can also be located by searching for user profiles that may be maintained by the instant messaging service. If a user knows the handle of another user, a request can be made to be added to the buddy list, start a conversation session, etc.

Because there is a certain amount of anonymity associated with creating a handle. Sometimes, users create handles with a malicious intent. For example, a user may pretend to be a peer of another user in order to gain that users confidence with the intent to victimize that user in some way. If a user is suspicious of another user, there is little that can be done other than reporting the incident to an authority.

An aspect of the present invention is to allow one end of a multiple (2 or more) way communication to transfer or duplicate his or her communication capability to another source, without the others of that communication noticing the transfer. This may also include transferring the communications previous history, if available. For example, a youth (victim) being illegally solicited in an instant messaging session by a (suspect) with whom the youth is communicating. The conversation could be transparently transferred to a third user such as an appropriate law enforcement agency or to some other authority. The first user (suspect) would not know that the communication has been transferred and would continue the conversation session with the transferee. The authority could use the active transferred communication to gather information about the suspect.

Such a system could also be useful in a customer service organization wherein a first user enters into a conversation session with a customer service representative. If the messaging needs to be escalated to anther person within the customer service organization, the transfer could take place in a seamless operation from the perspective of the first user.

Figure 4:
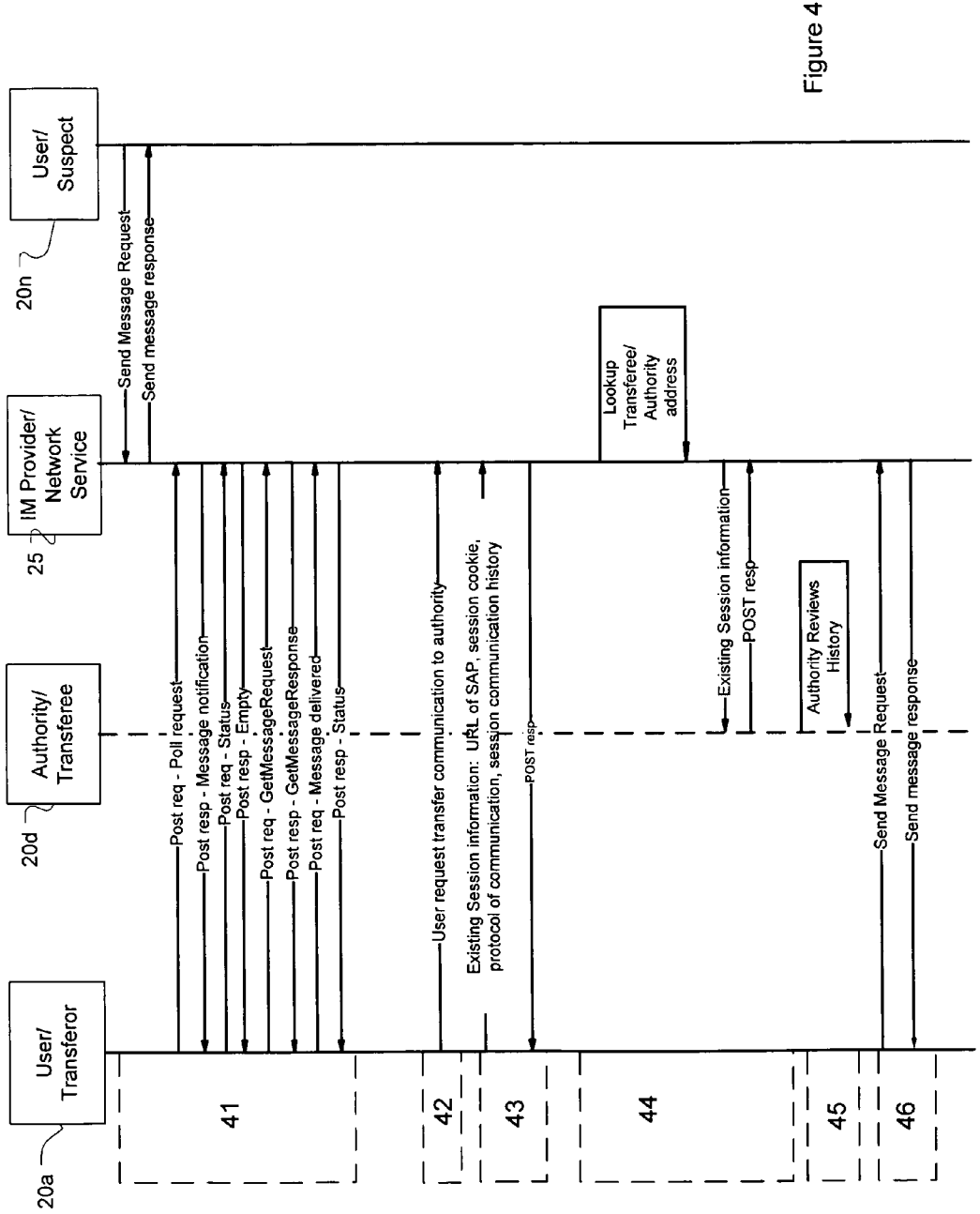
FIGS. 4, 5 and 6 present a flow diagram that illustrates the sequence of events during the transfer of an instant message session.
Figure 5:
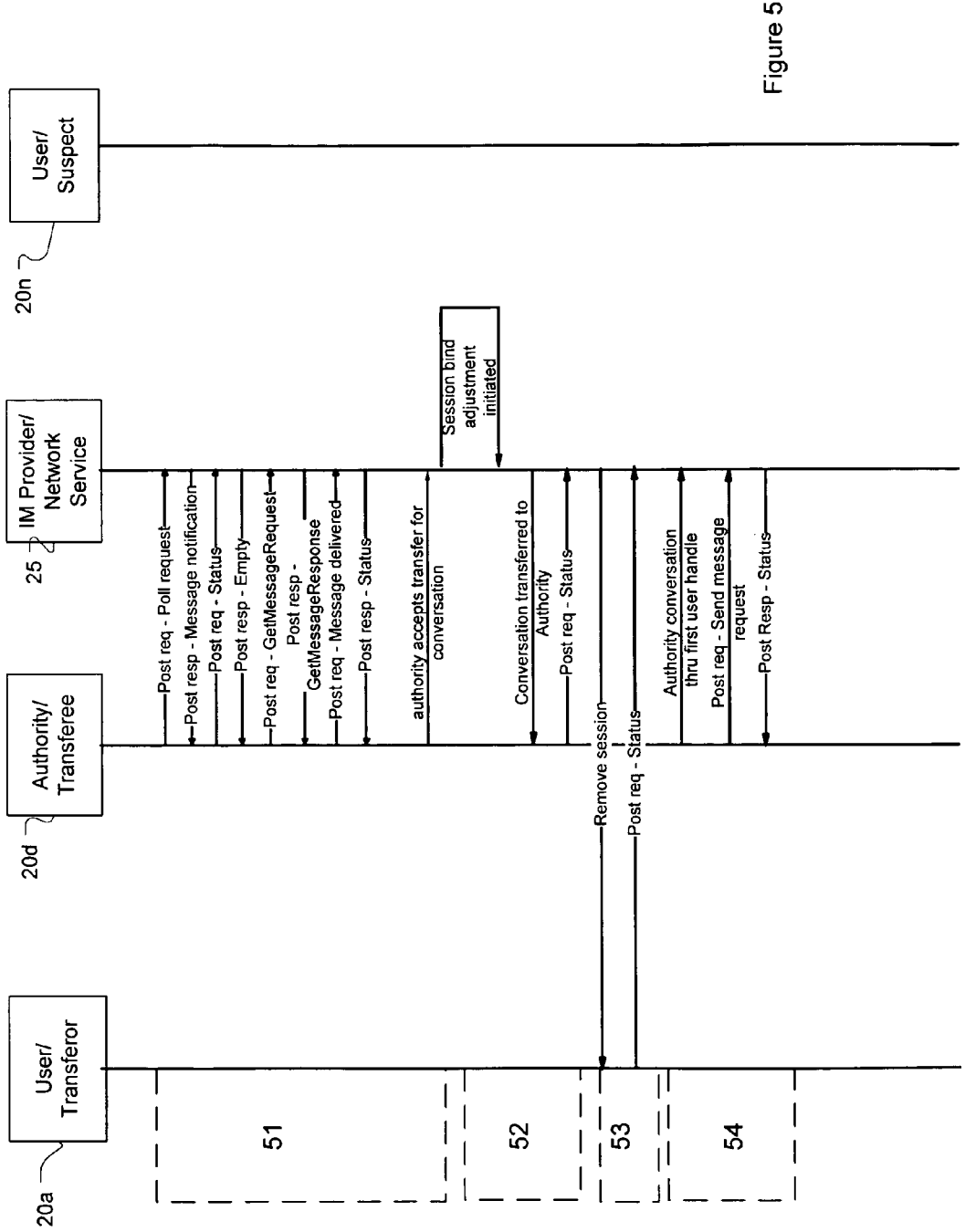
Figure 6:
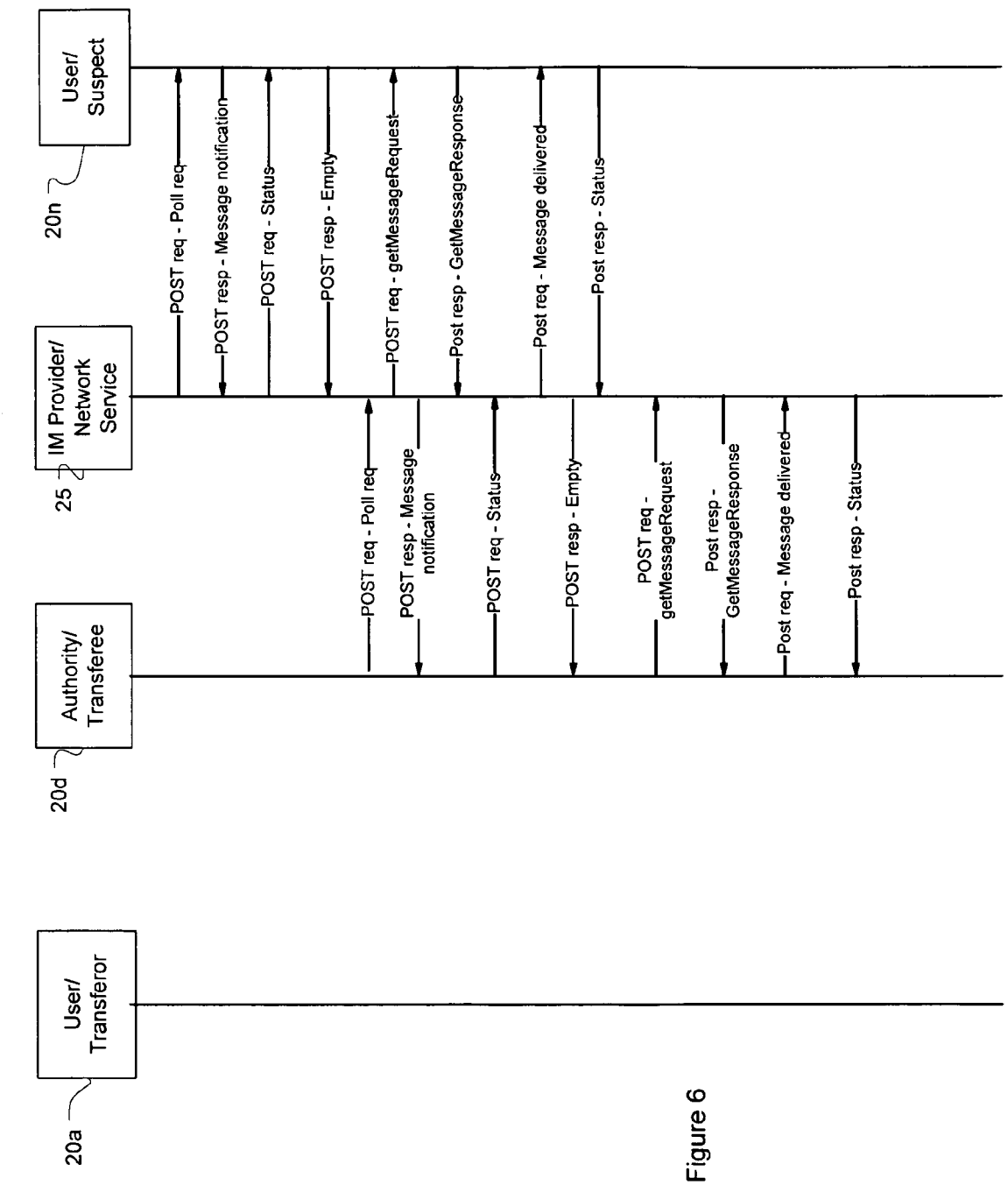

FIGS. 4, 5 and 6 illustrate the control flow involved in such a transfer. The protocol in the example is based on Wireless Village, but any similar messaging protocol could be suitably modified to perform the same functionality. The transaction steps performed at section 41 are normal instant messaging conversation usage between a first user 20a and a second user 20n. At some point during the instant message communication of section 41, the first user/transferor 20a desires to transfer the session to an authority/transferee 20d. This transfer is initiated by the first user/transferor 20a signaling to the service 25 that this communication is to be transferred to the authority/transferee 20d at section 42. Thereafter, the first user/transferor 20a sends the state information of the session to the network service 25 at section 43. Thereafter, the network service 25 looks up the transferee 20d address. This can be an authorized negotiation as well, but for purposes of this example flow, assume the user/transferor has a trusted hand-off authority predefined. At section 46, the authority/transferee 20d can review the information it has received, review the history of the message exchange, etc.

As shown at section 46, the conversation between the first user/transferor 20a and second user/suspect 20n may continue while the transferee 20d reviews the history and other information associated with the initial conversation session. It may also be desirable to for the ongoing communication between the first 20a and second user 20n to the authority 20d as well. At some point, the authority 20d will be ready to accept the transfer request. The transfer is negotiated between the transferee 20d and the network service 25.

At section 52, the network service 25 adjusts the session to transfer it over to the authority 20d. Preferably, the transfer is transparent to the suspect 20n. On the other hand, there may be instances wherein the transfer is acknowledged and accepted by the user 20n. For example, in the customer relations example, the first user 20a may indicate a desire to transfer the conversation session to a supervisor or other authority. Alternatively, a message may be posted to the user 20n indicating that the conversation session is being transferred. Thereafter, the communications for that session will originated from the authority 20d. Optionally, an acceptance signal can be sent to the first user 20a to notify that user that the session was transferred successfully. The network service 25 then closes the session of the first user 20a at section 53.

As indicated at section 54, from that point forward, the transferee 20d steps into the handle of the user 20a for the duration of the communication session with user 20n.

As shown in FIG. 6, the communications between transferee 20d and user 20n proceed uninterrupted normal IM conversation, except that the communications are now with authority 20d. As indicated previously, in the law enforcement example, the user 20n will not know that the communications were transferred. As such, the law enforcement personnel operating the session will be in a position to extract information from the user/suspect 20n to aid in law enforcement.

An exemplary system for implementing the invention includes a general purpose computing device in the form of a computer. Components of computer may include, but are not limited to, a processing unit, a system memory, and a system bus that couples various system components including the system memory to the processing unit. The computer typically includes a variety of computer readable media. Computer readable media can be any available media that can be accessed by a computer and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules. By way of example, and not limitation, communication media includes wired media such as a wired network or direct-wired connection, and wireless media such as acoustic, RF, infrared and other wireless media. Combinations of any of the above should also be included within the scope of computer readable media.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer and the like. When implemented on a general-purpose processor, the program code combines with the processor to provide a unique apparatus that operates to perform the functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices such as personal computers and PDAs, one skilled in the art will recognize that the present invention is not limited to such digital devices, as described in the present application may apply to any number of existing or emerging computing devices or environments, such as a gaming console, handheld computer, portable computer, DVD players, VCRs, home appliances, etc. whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather construed in breadth and scope in accordance with the appended claims.

What is claimed is:

1. In a communication service that establishes communication sessions between users communicatively coupled to the service, a method for transferring a communication session, the method comprising:

establishing a processor-implemented real-time communication session between a second user and a first user both communicatively coupled to the service, the second user having a second handle and the first user having a first handle;

receiving at least one message from the second user for delivery to the first user;

delivering the at least one message from the second user to the first user;

receiving a transfer request from the first user to transfer the communication session to a third user communicatively coupled to the communication service but not enabled to review ongoing communications between the first user and the second user;

transferring at least a partial history of the communication session to the third user;

establishing, responsive to receipt of the transfer request and prior to submission of an acceptance indicator by the third user, a connection between the third user and the communication session, the connection enabling the third user to review ongoing communications between the first user and the second user;

receiving, via an instant messaging protocol, the acceptance indicator from the third user; and transferring, responsive to receiving the acceptance indicator from the third user, the communication session from the first user to the third user, the transferring comprising:

reconfiguring the connection between the third user and the communication session to enable communications between the second user and the third user via the communications session; and disconnecting the first user from the communication session.

2. The method as recited in claim 1 wherein the communication session is an instant messaging session.

3. The method as recited in claim 1 wherein the third user is a law enforcement agency.

4. The method as recited in claim 1 comprising providing a notification to the second user that the session is being transferred.

5. The method as recited in claim 1 comprising transferring to the third user the at least one message.

6. The method as recited in claim 1 further comprising identifying the third user with the first handle, wherein communications originating from the third user and directed to the second user appear to the second user to originate from the first user.

7. The method as recited in claim 1 wherein no indication is provided to the second user that the communication session was transferred to the third user from the first user.

8. In a communication service that establishes communication sessions between computing devices communicatively coupled to the service, a system for transferring a communication session, the system comprising:

a first computing device communicatively coupled to the communications service; and a serving computing device configured to establish a communication session, via the communication service, between the first computing device and a second computing device communicatively coupled to the communications service, the serving computing device further configured to:
  receive a transfer request from the first computing device to transfer the communication session from the first computing device to a third computing device communicatively coupled to the communications service but not enabled to display ongoing communications between the first user and the second user;
  establish, responsive to receipt of the transfer request and prior to emission of an acceptance indicator from the third computing device, a connection between the third computing device and the communication session, the connection enabling the third computing device to display ongoing communications between the first user and the second user;
  transfer at least a partial history of the communication session to the third user;
  receive, via an instant messaging protocol, the acceptance indicator from the third computing device;
  transfer, responsive to receiving the acceptance indicator from the third user, the communication session from the first user to the third user, the transfer comprising:
    reconfiguring the connection between the third user and the communication session to enable communications between the second computing device and the third computing device via the communications session; and
    disconnecting the first computing device from the communication session.

9. The system as recited in claim 8 wherein the communication service comprises an instant messaging service.

10. The system as recited in claim 8 wherein the serving computing device transfers at least one message to the third computing device that was transmitted from the second computing device to the first computing device.

11. The system as recited in claim 8 wherein the third computing device is a computing device that has been preauthorized by the serving computing device to accept the transfer of the communication session.

12. The system as recited in claim 8 comprising a mechanism to provide a notification to the second computing device that the session is being transferred.

13. The system as recited in claim 8 comprising a mechanism for transferring to the third computing device at least one message sent from the second computing device to the first computing device.

14. In a communication service that establishes instant message communication sessions between users of the service, a memory device comprising an instant messaging protocol comprising, the instant messaging protocol comprising:
  a first protocol component for establishing a communication session between a first user and a second user by way of the service;
  a second protocol component for transferring, upon receiving a transfer request from the first user, the communication session from the first user to a third user communicatively coupled to the communication service but not enabled to review ongoing communications between the first user and the second user, the transferring comprising:
    establishing, responsive to receipt of the transfer request and prior to submission of an acceptance indicator by the third user, a connection between the third user and the communication session, the connection enabling the third user to review ongoing communications between the first user and the second user;
    receiving the acceptance indicator from the third user; and
    reconfiguring, responsive to receiving the acceptance indicator from the third user, the connection between the third user and the communication session to enable communications between the second user and the third user via the communications session;
  a third protocol component for transferring, prior to establishing the connection between the third user and the communication session, at least a partial history of the communication session to the third user; and
  a fourth protocol component for generating the acceptance indicator.

15. The memory device of claim 14 wherein the third user is preauthorized to accept the transfer.

16. The memory device of claim 14, the instant messaging protocol further comprising a fifth protocol component for disconnecting the first user from the communication session and for notifying the first user that the third user accepted the transfer.

17. The memory device of claim 14, the instant messaging protocol further comprising a sixth protocol component for notifying the second user that the communication session was transferred to the third user.

18. The memory device of claim 14, the instant messaging protocol further comprising a seventh protocol component for identifying the third user with a first handle of the first user, wherein communications originating from the third user and directed to the second user appear to the second user to originate from the first user.

* * * * *